Figure 1:
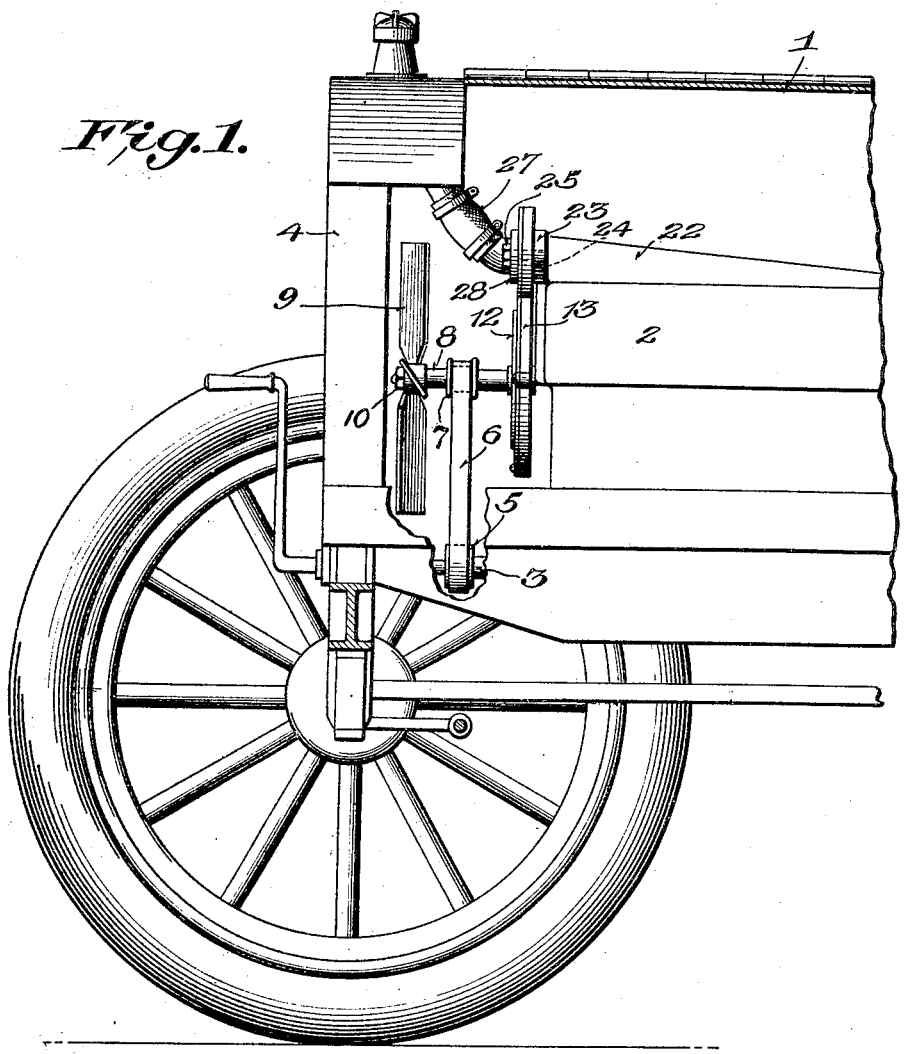

V. E. LASWELL.
ENGINE WATER PUMP.
APPLICATION FILED DEC. 20, 1919.

1,436,661.

Patented Nov. 28, 1922.

2 SHEETS—SHEET 1.

Inventor
Vernie E. Laswell
By Bacon & Thomas
Attorneys

Witness
Chas. L. Griesbauer

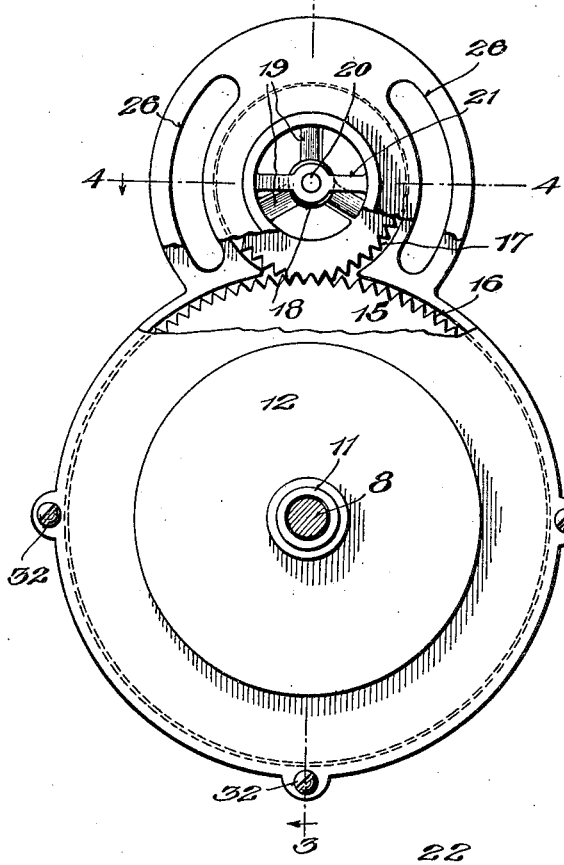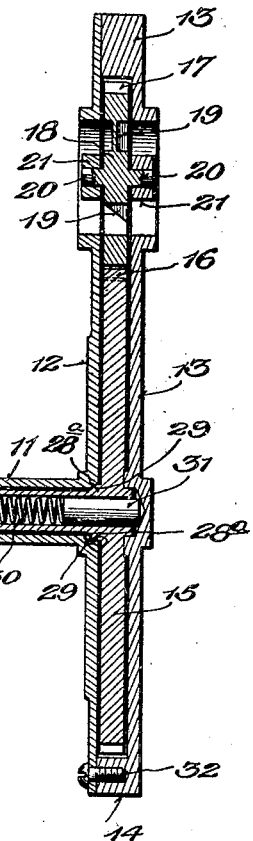

Patented Nov. 28, 1922.

1,436,661

UNITED STATES PATENT OFFICE.

VERNIE E. LASWELL, OF TALLADEGA, ALABAMA, ASSIGNOR OF ONE-HALF TO WILLIAM P. HURT, OF TALLADEGA, ALABAMA.

ENGINE WATER PUMP.

Application filed December 20, 1919. Serial No. 346,278.

*To all whom it may concern:*

Be it known that VERNIE E. LASWELL, citizen of the United States, residing at Talladega, in the county of Talladega and State of Alabama, has invented certain new and useful Improvements in Engine Water Pumps, of which the following is a specification.

The invention relates to improvements in a water circulating attachment adapted for application to internal combustion engines, and primarily intended for use in connection with motor vehicles.

It is an object of the invention to provide an attachment which is of a unitary and compact structure adapted to be supported from an engine, and having a driving connection with the cooling fan shaft of the engine to maintain a constant circulation in the water cooling system of the engine.

It is a further object of the invention to provide a water circulating attachment having a water pump and its driving gear disposed within a housing receiving the fan shaft to operate the pump in consonance with the operation of the fan shaft, which shaft, of course, is driven from a crank shaft of an engine and is in operation whenever the engine is in use.

The invention further comprehends a self-contained water circulating system, embodying the housing for the water pump and its operating gear, having a water inlet and exit leading to and from the housing for maintaining a circulation. The housing is adjustably supported or attached to the motor in any convenient way, and an adjustment of the housing in no way affects the water pump or its driving gear, but is capable of tightening the fan belt when such an action is necessary. It will be understood that the pump and its operating gear are supported in the housing so that when the housing is adjusted the said pump and gear move bodily therewith which eliminates any possibility of the driving gear and pump from being thrown out of driving relation.

It is a still further object of the invention to provide a water circulating attachment wherein the pump operating gear and its housing is fashioned so as to always maintain a water tight connection between said gear and housing without necessitating the use of a packing and gland which is now commonly employed. In carrying out the invention, this water tight connection is provided without having a frictional contact between the entire gear and its housing, the gear merely having a projecting smoothly finished surface on one side at a point adjacent the connection of its driving shaft therewith to cooperate with a complemental surface disposed within the gear housing.

In the accompanying drawings forming a part of this application, I have disclosed a single embodiment of the invention, but it will be understood that the same is susceptible of many changes with regard to the arrangement, construction, and combination of elements, without departing from the spirit of the invention.

In the drawings, Figure 1 represents a side elevation of the device applied to a machine. Figure 2 is a view with a portion of the pump in section. Figure 3 is a section on line 3—3 of Figure 2, and Figure 4 is a section on line 4—4 of Figure 2.

Referring now more particularly to the drawings wherein like reference characters indicate corresponding parts, the numeral 1 designates a section of a motor vehicle which may be of any construction, having a motor 2 therein provided with any desired number of cylinders and a crank shaft 3. A radiator 4 that may be of any conventional type is mounted upon the vehicle, having the upper and lower headers between which is disposed the water circulating tubes. The crank shaft 3 of course at one end is associated with the usual transmission, while the other end of the crank shaft at a point in front of the motor receives a pulley 5 which may be keyed thereto so as to rotate with the shaft, which pulley receives the belt 6 adapted to pass around a pulley 7 mounted upon the fan shaft 8.

The fan shaft 8 has fixedly attached thereto at its outer end a fan 9, which fan is held in position by the nut 10 and rotates with the shaft. Any type of fan may be used, as the specific construction thereof is immaterial.

The fan shaft 8 at its inner end passes through an opening or bearing 11 formed in a plate 12 secured to the housing 13. This housing 13 may consist of metal or any other suitable material, having an outstanding flange 14 to provide the necessary space for receiving a pump driving gear 15 having teeth 16 adapted to mesh with the peripheral teeth 17 disposed upon the pump 18 positioned above said gear 15. It will be manifest that a rotation of the shaft 8, which occurs whenever the engine is in operation due to the belt connection between said shaft and the crank shaft 5, causes the pump gear 15 to likewise rotate, and the intermeshing teeth of this gear and the pump 18 rotate said pump. The pump 18 may be of any convenient construction, but for the purpose of illustrating the invention, the same is shown as being of a somewhat open formation, having the radial pump plates 19 projecting from the hub 20 of the pump supported in the spiders or bearings 21 formed in the housing 13 and the cover plate 12. The entire attachment, including the fan shaft 8 and its fan is supported in position through the medium of the heated water outlet pipe 22, which is provided with a flange 23 having apertures 24 therein adapted to receive fastening bolts 25 passing through segmental slots 26 formed in the housing 13 and its cover plate 12. From the outlet side of the pump there is disposed the usual flexible water conducting tubing 27, having a flanged end 28 which rests against the outer side of the plate 12 surrounding the pump and is secured in position by the bolts 25 heretofore described. This tubing, of course, communicates with the radiator for returning heated water thereto. It will be observed that the slots 26 in the attachment are relatively long and the purpose of these slots is to enable the entire attachment to be adjusted relative to the flanged water outlet pipe from the motor, which adjustment of course moves the attachment bodily and likewise moves the fan shaft 8 so as to tighten the fan belt 6 when such an action is necessary. The adjustment of the attachment, however, does not in any way affect the engagement between the pump and its driving gear, as both of such elements move together bodily when an adjustment is made. The pump plates 19 are constructed so as to propel the water directly through the pump as distinguished from a centrifugal pump, although it will be apparent that a centrifugal pump can be used, if such is desirable.

The bearing 11 at its inner side is formed with a concave surface 28 adapted to cooperate with a convex portion 29 projecting from the pump gear 15, and to maintain these surfaces in a relatively tight and non-leaking union, there is disposed within the fan shaft 8 a coil spring 30 engaging a plunger 31, the outer end of which engages the side of the housing 13, serving to always urge the gear toward the fan and to maintain the convex surface 29 thereof in tight relation with its seat. It will be observed that this convex surface projects outwardly beyond the vertical plane of the gear so that the sides of the same do not have frictional contact with the cover plate 12, but only the high spot or convex portion 29 thereof is in such a frictional engagement with the seat 28. The plate 12 is preferably united to the housing 13 by fastening bolts 32 which enable the plate to be readily removed from the housing, if desirable, but retains the same in its desired position when the pump is in operation.

From the foregoing it will be observed that the attachment is one that is of a unitary structure, the essential elements thereof being all arranged and maintained in their proper relation in the housing, and the attachment can conveniently be applied to any type of motor vehicle now in use with ease.

Having thus described the invention, what I claim is:

1. The combination with an internal combustion engine having a crank shaft, of a fan shaft and a driving connection therebetween, a fan mounted on said shaft, a housing adapted to receive said shaft, a gear driven by the shaft and disposed within the housing, and a water pump positioned within said housing and having a driving relation with said gear, and means for supporting said housing in position.

2. The combination with an internal combustion engine having a crank shaft, of a fan shaft and a driving belt between said crank shaft and fan shaft, a water pump having communication with the engine and a radiator, means for driving said pump from the fan shaft, and a housing for said pump and its driving means and means for adjustably supporting the housing to enable the fan belt to be tightened.

In testimony whereof I affix my signature.

VERNIE E. LASWELL.